(12) United States Patent
Chang

(10) Patent No.: US 7,663,692 B2
(45) Date of Patent: Feb. 16, 2010

(54) INFRARED CLOSE-CIRCUIT TELEVISION CAMERA

(76) Inventor: Hai-Chin Chang, No. 50-3, Wugong 5th Rd., Wugu Township, Taipei County (TW)

( * ) Notice: Subject to any disclaimer, the term of this patent is extended or adjusted under 35 U.S.C. 154(b) by 394 days.

(21) Appl. No.: 11/879,293

(22) Filed: Jul. 17, 2007

(65) Prior Publication Data

US 2009/0021634 A1    Jan. 22, 2009

(51) Int. Cl.
  *H04N 5/225*  (2006.01)
  *G03B 17/00*  (2006.01)
(52) U.S. Cl. .................... 348/372; 348/373; 396/427
(58) Field of Classification Search ............... 348/151; 396/427, 28
See application file for complete search history.

(56) References Cited

U.S. PATENT DOCUMENTS

| | | | | |
|---|---|---|---|---|
| 6,234,691 B1 * | 5/2001 | Jones et al. | ............... | 396/427 |
| 6,678,001 B1 * | 1/2004 | Elberbaum | ............... | 348/373 |
| 6,860,654 B1 * | 3/2005 | Ching-Wen | ............... | 396/427 |
| 7,324,154 B2 * | 1/2008 | Cheng | ............... | 348/373 |
| 7,425,101 B2 * | 9/2008 | Cheng | ............... | 396/427 |
| 7,520,685 B2 * | 4/2009 | Lee | ............... | 396/427 |

* cited by examiner

*Primary Examiner*—Luong T Nguyen
(74) *Attorney, Agent, or Firm*—Pro-Techtor Int'l Services; Ralph Willgohs

(57) ABSTRACT

The present invention provides an improved infrared closed-circuit television camera (CCTV) camera installed with rechargeable batteries on a rotary stand. When power supply is normal, electrical power is stored into the rechargeable batteries, which supply power to the CCTV camera, in case of power failure or damages to the power system due to fire outbreak. In this way, the CCTV camera can transmit monitored images to the monitoring center. Moreover, in case of fire or power failure, the rechargeable batteries supply power to the LED lighting sets, which automatically glitter for emergency escape illumination. Furthermore, when night illumination is less than 5 Lux during normal power supply, the LED lighting sets automatically glitter for night illumination.

3 Claims, 4 Drawing Sheets

INFRARED CLOSE-CIRCUIT TELEVISION CAMERA

BACKGROUND OF THE INVENTION

1. Field of the Invention

The present invention relates to a close-circuit television (CCTV) camera installed with rechargeable batteries for emergency power supply in case of fire or power failure, such that monitored images are timely transmitted to the monitoring center for optimum disaster relief and protection as well as subsequent investigation and evidence recording.

2. Description of the Prior Art

Conventional CCTV cameras are installed on entrances, exits, passageways and some hardly visible and frequented hidden places of shops, buildings or communities to keep timely records of monitored images for subsequent investigation and evidence recording. Moreover, crime deterrence can be achieved via CCTV cameras.

Infrared diodes are installed on a front of a lens inside a conventional CCTV camera, such that the CCTV camera records and monitors images in darkness, thereby achieving hidden recording of evidence. However, in case of fire, no power is supplied to the CCTV camera to transmit monitored images to the monitoring center, thereby preventing the monitoring personnel from effectively keeping track of fire spots for emergency escape lighting and preventing subsequent investigation and evidence recording. However, given that LED lighting is not installed inside conventional infrared CCTV cameras, conventional infrared CCTV cameras fail to provide night illumination, when night illumination is less than 5 Lux.

SUMMARY OF THE INVENTION

A primary object of the present invention is to provide a CCTV camera installed with rechargeable batteries. When power supply is normal, electrical power is stored in the rechargeable batteries, which supply power to the CCTV camera in case of power failure or damages to the power system due to fire outbreak. In this way, the CCTV camera can transmit monitored images to the monitoring center and keep records of such images for subsequent investigation and evidence recording.

Another object of the present invention is to install LED lighting inside the CCTV camera as emergency lighting. Therefore, in case of darkness at night or fire outbreak or power failure, the monitoring center can support emergency escape lighting and direct people to evacuation and escape routes on the basis of the fire spots detected from the monitored images. Moreover, when night illumination is less than 5 Lux during normal power supply, the LED lighting will be automatically started for night illumination.

To enable a further understanding of the objectives and the technological methods of the invention herein, the brief description of the drawings below is followed by the detailed description of the preferred embodiments.

DETAILED DESCRIPTION OF THE PREFERRED EMBODIMENTS

Figure 1:
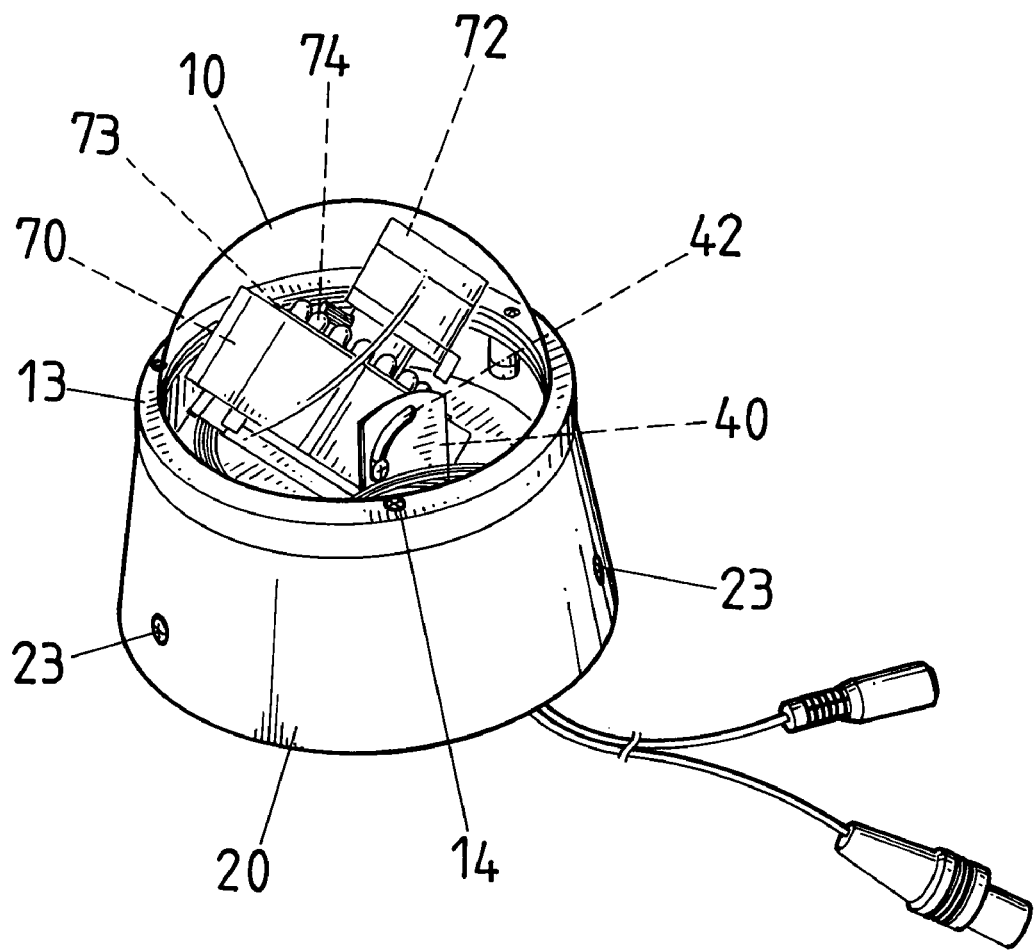
FIG. 1 is a schematic view illustrating an appearance of the present invention.
Figure 2:
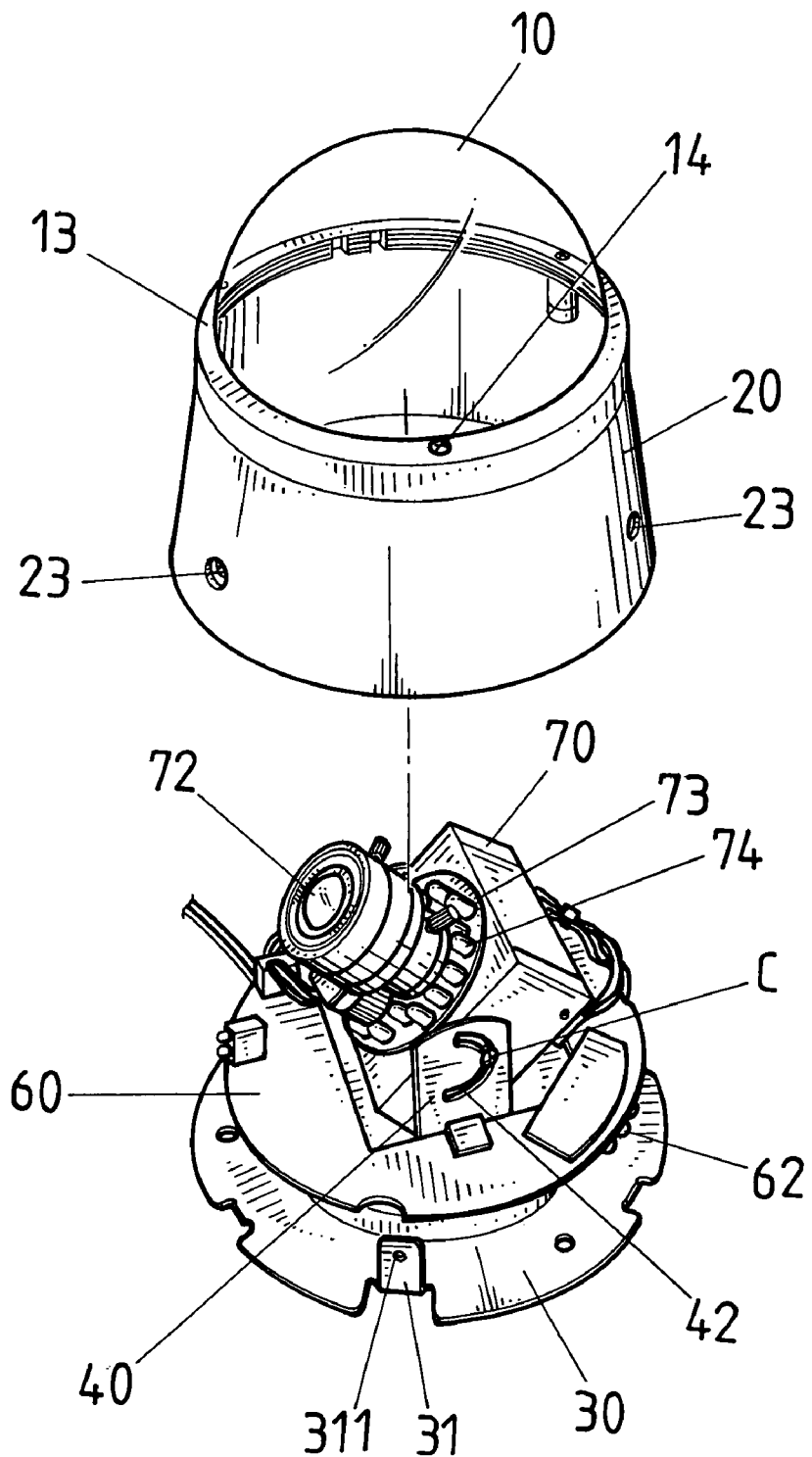
FIG. 2 shows a partial exploded view of the present invention.
Figure 3:
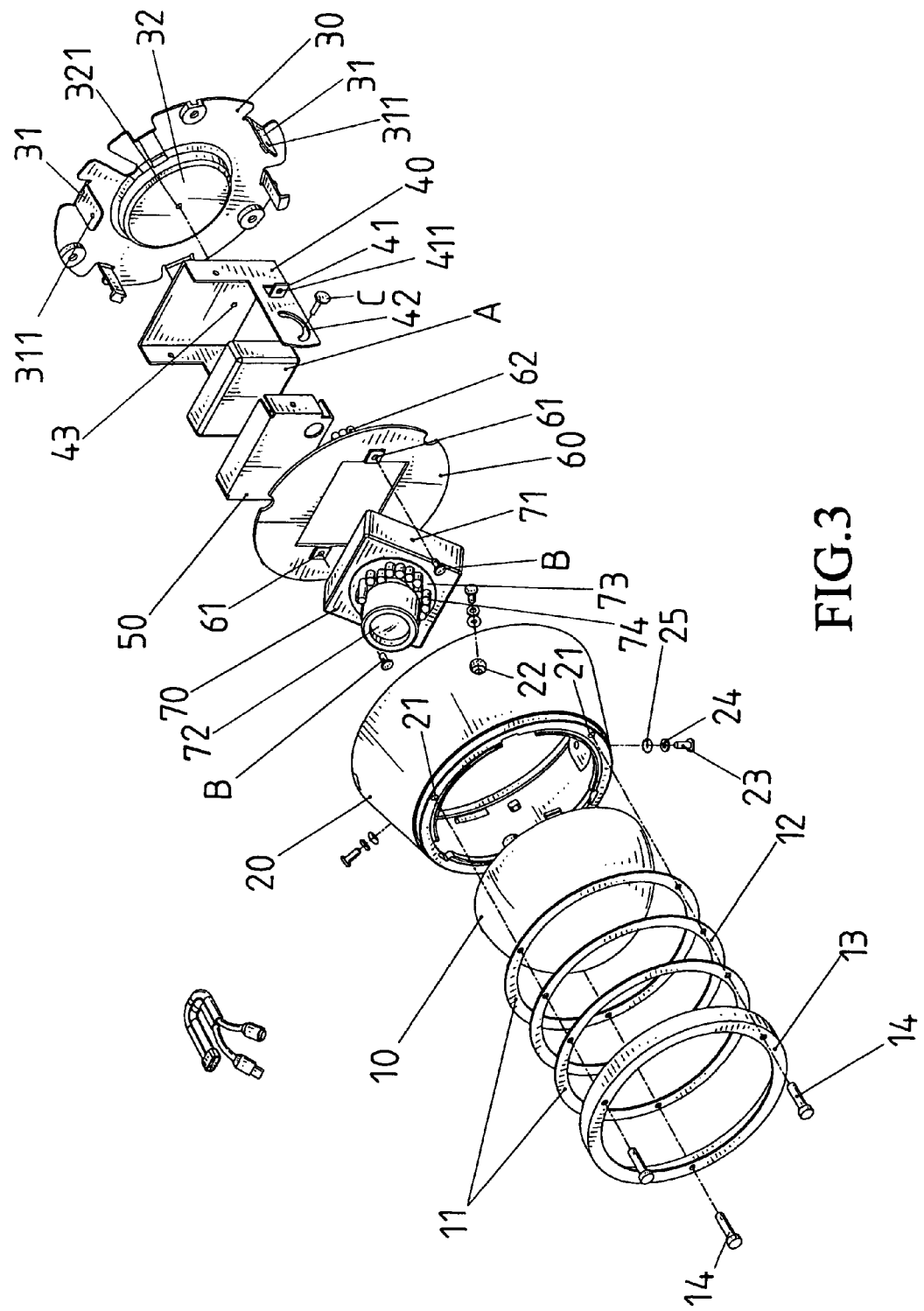
FIG. 3 shows an exploded view of the present invention.
Figure 4:
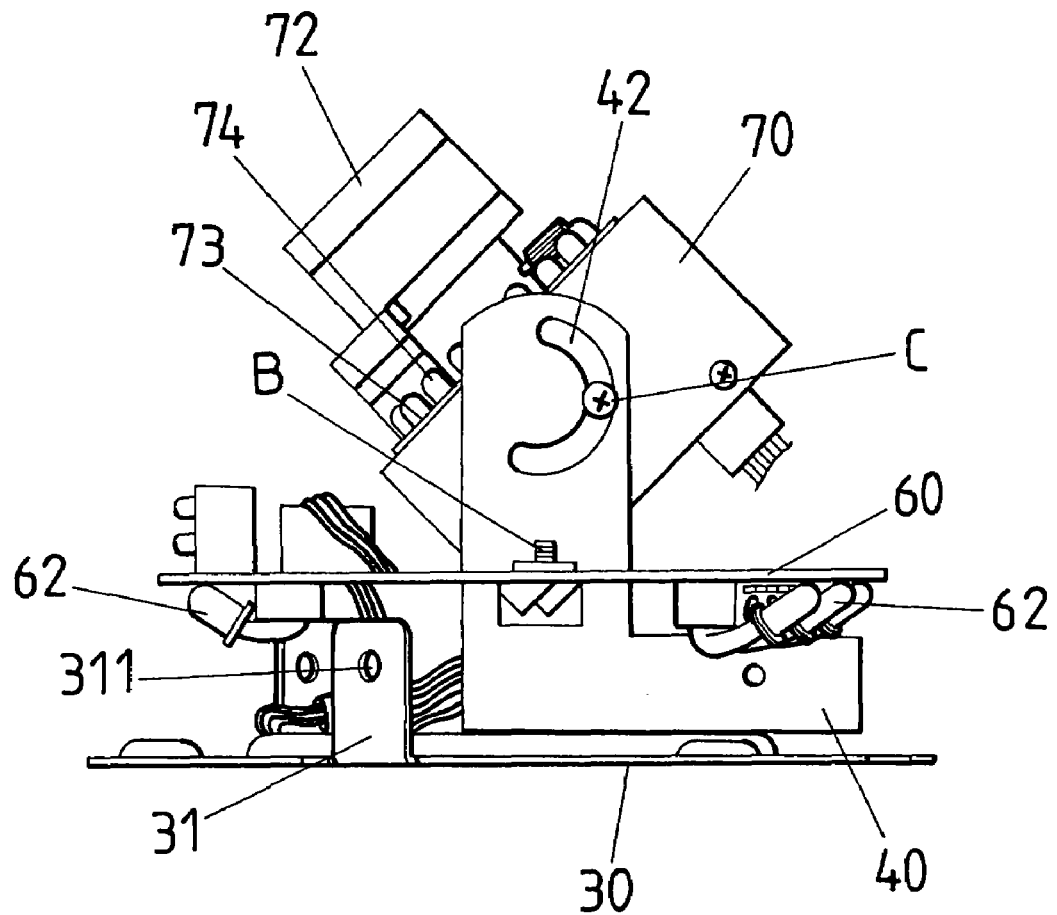
FIG. 4 is a side perspective view illustrating an internal structure of the present invention.

Referring to FIGS. 1~4, the infrared CCTV camera of the present invention includes a light-diffusing dome 10, a housing 20, a bottom base 30, a rotary stand 40, a battery cover 50, a printed circuit board (PCB) 60, and a camera mount 70. The light-diffusing dome 10 is embedded on a front rim of the housing 20. Two water-proof washers 11, an inner lining 12 and an outer lining 13 are inserted around the light-diffusing dome 10, which is bolted into a plurality of screw holes 21, each formed at a front rim of the housing 20 respectively through a plurality of screws 14.

A plurality of mounting plates 31, each including a screw hole 311, is inward recessed on the bottom base 30. When the housing 20 is covered over the bottom base 30, a screw 23 respectively passes through a gasket 24, an O-ring 25 and a via hole 22 of the housing 20, before being bolted into the corresponding screw hole 311 of the corresponding mounting plate 31 formed on the bottom base 30. A disc 32 formed at a center in an interior of the bottom base 30 allows for the attachment of the rotary stand 40 onto a side of the disc 32. A central shaft passes through a central hole 321 formed at a center of the disc 32 and is axially joined to an axial hole 43 formed on the rotary stand 40. In this way, the L-shaped rotary stand 40 can rotate on the bottom base 30.

After inserting rechargeable batteries A into the rotary stand 40 and bolting the battery cover 50, each of two screws B respectively passes through each of corresponding via holes 61 formed on the printed circuit board (PCB) 60 and is bolted into a corresponding screw 411 formed on a corresponding flange 41 of the rotary stand 40. A plurality of LED lighting sets 62 is installed on a bottom rim of the PCB 60. Each LED lighting set 62 includes three LED bulbs, which do not glitter during bright daytime, but automatically glitter in darkness at night. The LED bulbs are replaceable and can be inserted with lights of diverse color options.

Moreover, a long, curved slot 42 is respectively formed on each of two ends of the rotary stand 40. A screw hole 71 is respectively formed on each of two sides of the camera mount 70. Each of bolts C passes through the long slot 42 and is bolted into the screw hole 71. By positioning the bolts C at a suitable location inside the long slot 42 for adjusting the slanting angle of the camera mount 70, a lens 72 is formed at a front end of the camera mount 70.

A plurality of infrared diodes 74 is installed on an interior printed circuit board 73, such that the CCTV camera can record and monitor images in darkness. In case of power failure or damages to power due to fire, the rechargeable batteries A can supply power to the infrared diodes 74 (for more than two hours even after power disconnection), which are started in order to transmit monitored images to the monitoring center. The rechargeable batteries A can supply power to the LED lighting sets 62 (for approximately four hours even after power disconnection) for emergency escape lighting.

As apparent from the foregoing, the primary object of the present invention is to provide a CCTV camera installed with rechargeable batteries, which supply power to the infrared diodes of the CCTV camera, in case of power failure or damages to the power system due to fire. In this way, the CCTV camera transmits the monitored images to the monitoring center. Moreover, the rechargeable batteries can supply power to the LED lighting sets for automatic illumination. On the other hand, when night illumination is less than 5 Lux during normal power supply, the LED lighting sets automatically glitter for night illumination.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An infrared close-circuit television camera, comprising:
   a light-diffusing dome;
   a housing, comprising a front rim for embedding onto the light-diffusing dome, wherein two water-proof washers, an inner lining and an outer lining are inserted around the light-diffusing dome, which are bolted into the housing through a plurality of screws;
   a bottom base, being covered over by the housing and inward recessed with a plurality of mounting plates, each comprising a screw hole, the bottom base being bolted into the screw hole of a corresponding mounting plate formed on the bottom base after a screw passes respectively through a gasket, an O-ring and a via hole of the housing, and comprising a disc, including a central hole in a center thereof, formed at a center in an interior of the bottom base;
   a rotary stand, comprising flanges each having screw holes, provided with a long, curved slot respectively formed on each of two ends of the rotary stand, and comprising a side surface flatly attached onto the disc of the bottom base, such that a central shaft passes through the central hole formed at the center of the disc and is axially joined into an axial hole formed on the rotary stand;
   a printed circuit board, provided with via holes for screws passing through and being respectively bolted into the screw holes formed on the flanges on the rotary stand; and
   a camera, provided with a camera screw hole formed respectively on two sides, such that after a bolt passes through the long, curved slot and is bolted inside a corresponding camera screw hole, a plurality of infrared diodes is formed on an interior printed circuit board; wherein rechargeable batteries, installed inside the rotary stand, store electrical power when power supply is normal, in case of power failure or damages to power due to fire, the rechargeable batteries supply power to the camera, which transmits monitored images to a monitoring center.

2. The infrared close-circuit television camera as claimed in claim 1, wherein a plurality of LED lighting sets is installed on a bottom rim of the printed circuit board, and the rechargeable batteries supply power to the plurality of LED lighting sets, which automatically glitter in darkness.

3. The infrared close-circuit television camera as claimed in claim 1, wherein, when night illumination is less than 5 Lux during normal power supply, the plurality of LED lighting sets automatically glitter for night illumination.

* * * * *